H. W. PAULUS.
MANUFACTURE OF OXALATE.
APPLICATION FILED JULY 26, 1920.
1,420,213. Patented June 20, 1922.
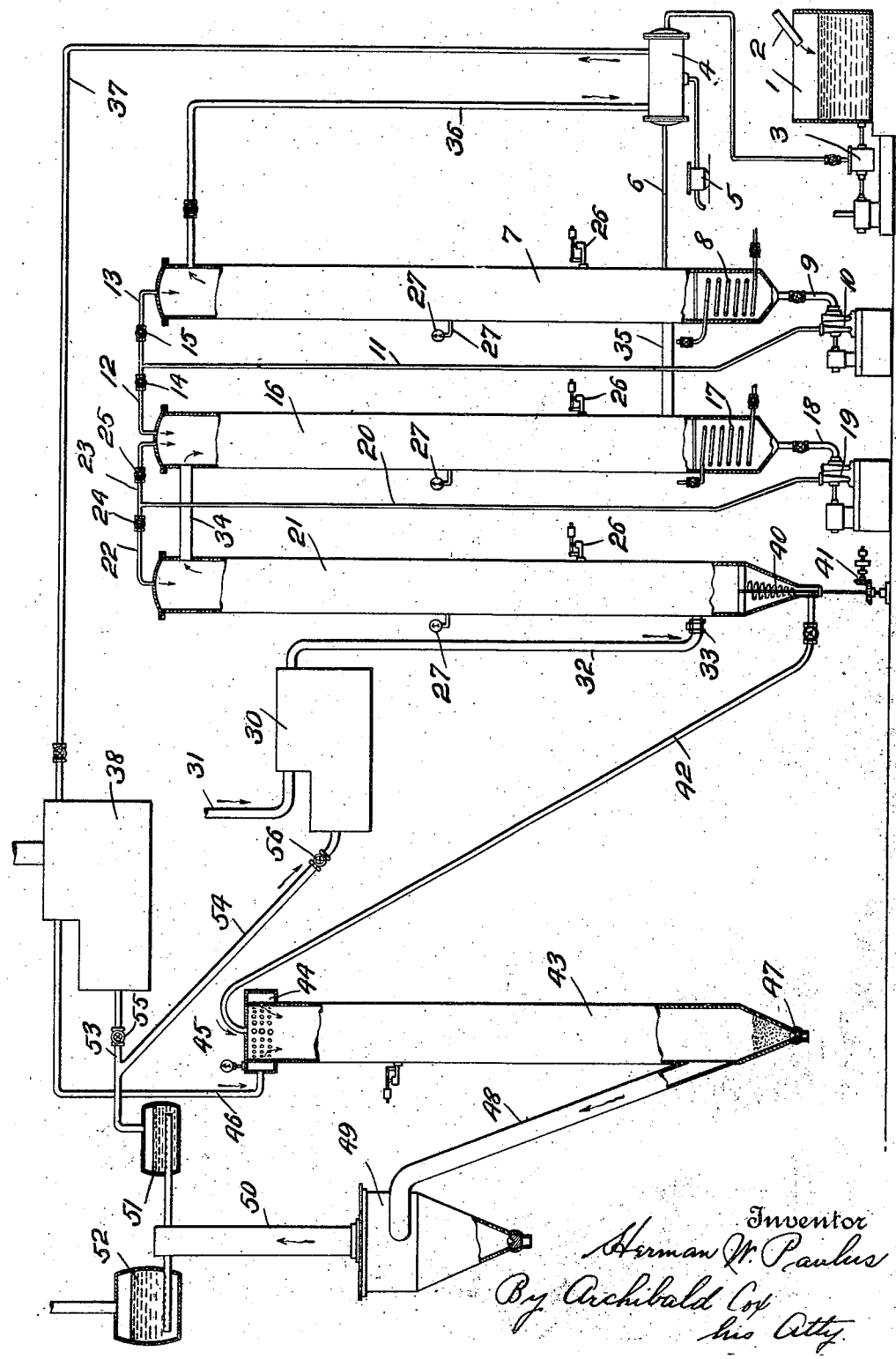

UNITED STATES PATENT OFFICE.

HERMAN W. PAULUS, OF RICHMOND HILL, NEW YORK, ASSIGNOR TO ROYAL BAKING POWDER COMPANY, A CORPORATION OF NEW JERSEY.

MANUFACTURE OF OXALATE.

1,420,213.               Specification of Letters Patent.     Patented June 20, 1922.

Application filed July 26, 1920. Serial No. 399,086.

*To all whom it may concern:*

Be it known that I, HERMAN W. PAULUS, a citizen of the United States, and a resident of Richmond Hill, Long Island, in the county of Queens and State of New York, have invented certain new and useful Improvements in the Manufacture of Oxalate, of which the following is a specification.

The invention relates to the manufacture of oxalates.

The object of the invention is to increase the percentage of production of oxalate from a given amount of formate and at the same time decrease the cost of manufacture. With this object in view, the invention consists in manufacturing oxalate from finely divided dry formate, which is subjected to the requisite heat to convert it into oxalate by dropping it through a descending vertical column of heated gases. For the purpose of illustrating the principles of the invention, the manufacture of sodium oxalate will be specifically described. It will be understood, however, that the invention is not to be restricted to the manufacture of sodium oxalate, inasmuch as the production of all kinds of oxalates, and particularly the alkaline oxalates, are within the purview of the invention.

The process of the invention may be performed in any usual or preferred form of apparatus. In the accompanying drawing is illustrated diagrammatically a series of apparatus or receptacles operatively connected together and sealed against the atmosphere suitable for the practice of the process.

The preliminary process of making the sodium formate consists in subjecting a solution of the metal hydroxide to the carbon monoxide gas at the requisite temperature and pressure to convert the hydroxide solution into a formate solution and then evaporating the formate. The evaporated formate in a finely divided state is then passed through a heated zone in accordance with the principles of the invention to convert the formate into oxalate.

The caustic soda solution utilized for the process is received in the first instance in a tank 1 through a conduit 2. The solution is raised from the tank 1 by a pump 3 into a preheating drum and steam condenser 4 with which a steam trap 5 is connected. From the preheating drum and steam condenser 4 the solution passes by gravity through a pipe 6 into an upright receptacle or tank 7 in the lower end of which is placed a steam coil 8 for supplying sufficient heat to begin the desired chemical reaction. Inasmuch as the reaction of the carbon monoxide with the caustic soda is exothermic, the supply of steam may be shut off after the process is fairly under way. The solution flows from the tank 7 through the pipe 9 into a centrifugal pump 10 by which it is raised through the pipe 11 having the two branches 12 and 13 at its upper end. By adjusting the valves 14 and 15 located in the branch pipes 12 and 13, respectively, the amount of solution which passes through them may be regulated. It is desirable that the greater portion of the solution passing up through the pipe 11 be returned to the tank 7 for further reaction with the carbon monoxide and that only a small portion of the solution pass from the pipe 11 into the second tank or receptacle 16. The solution enters the tanks 7 and 16 in finely subdivided or spray-like condition.

The solution which enters the tank 16 passes through a pipe 18 into a centrifugal pump 19 by which it is raised through the pipe 20 to the branch pipes 22 and 23. The valves 24 and 25 located respectively in the branch pipes 22 and 23 are so adjusted that the greater part of the solution is returned to the tank 16 and only a small portion of the solution is permitted to enter the tank 21. In the bottom of the tank 16 is placed a steam coil 17 which is used for the same purpose as the steam coil 8 in the tank 7. While the caustic soda solution is passing through the tanks 7 and 16 it is converted into sodium formate as will more clearly appear below and the sodium formate solution thus formed is evaporated and thoroughly dried in the tank 21. Each of the tanks 7, 16 and 21 is provided with a safety valve 26 and a thermometer 27.

While the solution, first in the form of caustic soda and then in the form of sodium formate, is passing sequentially through the tanks 7, 16 and 21, carbon monoxide is caused to travel through the tanks in the reverse direction, namely, first through the tank 21, then through the tank 16 and finally through the tank 7. The first action of the ot carbon monoxide is to properly dry the sodium formate entering the tank 21, and then the more or less steam laden carbon monoxide passing from the tank 21 enters the tanks 16 and 7 to convert the caustic soda therein into sodium formate. The carbon monoxide used may be obtained from ordinary purified producer gas. This gas enters a superheater 30 through a pipe 31 and is raised to a temperature of about 200° C. and is put under pressure of substantially 150 pounds. From the superheater 30 the carbon monoxide gas passes through a pipe 32 having a check valve 33 into the lower end of the third or formate tank 21. As the hot gas rises in the tank 21 it intimately mingles with the particles of sodium formate falling through the tank from the branch pipe 22 and thoroughly dries them. This action reduces the temperature of the carbon monoxide so that it enters the tank 16 through the connecting pipe 34 at substantially 175° C. This temperature is sufficient for converting the caustic soda into sodium formate. From the tank 16 the carbon monoxide passes through the connecting pipe 35 into the tank 7 and from the tank 7 the residue gases, namely, the nitrogen and the hydrogen accompanying the carbon monoxide, pass through the pipe 36 into the preheating drum and steam condenser 4. These gases are saturated with steam which has been taken up by evaporating the sodium formate in the tank 21 and by passing through the caustic soda and sodium formate solutions in the tanks 16 and 7. In the steam condenser 4 the steam is condensed and carried off through the trap 5. The gases freed from the steam pass through the pipe 37 into the superheater 38. The finely divided sodium formate falling into the bottom of the tank 21 is kept in its powdered condition by a stirrer or agitator 40 driven by the gears 41.

The powdered formate is introduced through a pipe 42 into an oxalate converter or retort 43 where it is converted into oxalate. The upper end of the converter 43 is provided with a jacket 44 for the admission of the hot gases by which the formate is converted into oxalate. The jacket 44 opens into the retort through a series of holes 45. The heating medium for converting the formate into oxalate consists of gases supplied from the superheater 38 whence they pass through the pipe 46 into the jacket 44 and from there through the holes 45 into the interior of the retort. It is well known that formate converts into oxalate at a temperature ranging from 360° C. to 440° C. and that under certain conditions, below and above these temperatures it converts into carbonate. Consequently it is necessary to raise the formate from a temperature of about 200° C., at which the formate is stable, to at least 360° C. as quickly as possible in order to prevent it from converting into carbonate. The present process effectively prevents the formation of carbonate. Inasmuch as the sodium formate is in a finely divided state it offers a relatively large surface to the action of the hot gases and is thereby instantly converted into sodium oxalate, the conversion efficiency being fully 98%. The powdered oxalate falls to the bottom of the retort whence it is conducted by the rotating valve 47.

The hot gases from the converter or retort 43, now enriched by the hydrogen given off by the formate in converting into oxalate, pass through a pipe 48 into the dust collector 49 for the elimination of fine particles of oxalate therefrom. From the dust collector 49 the gases pass through the discharge pipe 50 into a water seal 51 and thence through the pipes 53 and 54 into the superheaters 30 and 38 where they are utilized for heating purposes. A second water seal 52 is provided which acts as an automatic relief in case the valves 55 and 56 are closed.

It will be observed that when the finely divided dry formate is introduced into the top of the descending vertical column of inert gases which are maintained in the retort 43 at a temperature ranging from 360° C. to 440° C., the particles of formate remain in suspension in the heated gases an appreciable length of time. The minuteness of the particles is such that the period of suspension is amply sufficient for substantially complete conversion into oxalate. This will be understood when it is considered that each particle is entirely surrounded by the heated gas. It will thus be seen that the conversion of the formate particles into oxalate must take place readily, and that the efficiency of conversion must be relatively high. So far as known, the conversion of formate into oxalate has heretofore involved treating the formate in mass, and never as separate particles, separated from each other by an appreciable amount of converting gas. In this connection it will be borne in mind that the heat conductivity of the formate particles is very low and consequently the heat is conveyed to them better by convection than by transmission.

Having thus pointed out the principles of the invention and illustrated and described an apparatus in which the invention may be practiced, what is claimed as new is:

1. The process of making oxalate from finely divided dry formate which consists in maintaining a descending vertical column of inert gases at a temperature ranging from 360° C. to 440° C., and dropping the finely divided formate into the column of heated gases.

2. The process of making oxalate from finely divided dry formate which consists in maintaining a descending vertical column of inert gases at a temperature ranging from 360° C. to 440° C. and suspending the finely divided formate in the column of heated gases until it is converted into oxalate.

3. The process of making oxalate from formate which consists in maintaining inert gases at a temperature ranging from 360° C. to 440° C. and dropping finely-divided formate into the heated gases.

4. The process of making oxalate from formate which consists in maintaining a descending column of finely divided dry formate and surrounding the particles of formate with gases heated to a temperature ranging from 360° C. to 440° C.

HERMAN W. PAULUS.